Aug. 6, 1940.  H. E. FARMER  2,210,864
PRETZEL MAKING APPARATUS
Filed Jan. 13, 1938   6 Sheets-Sheet 3
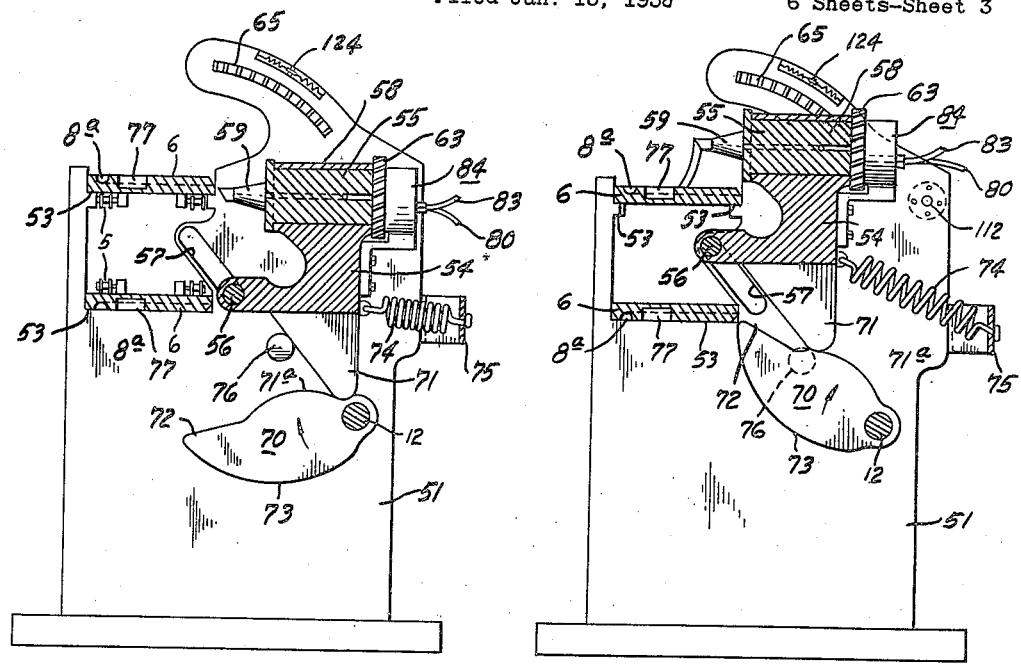
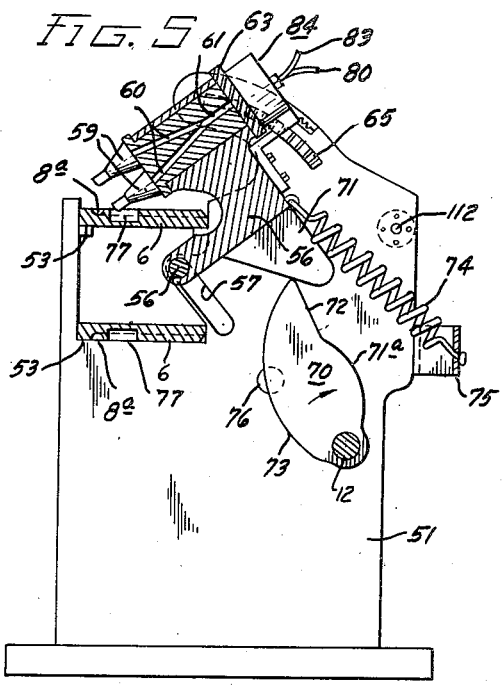
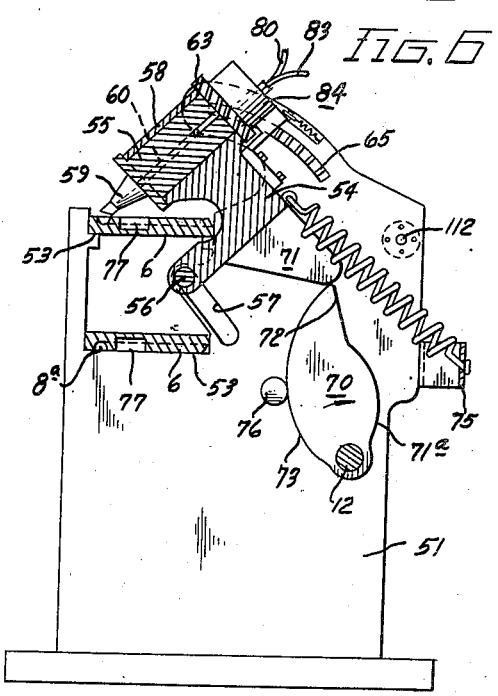
INVENTOR
BY HORACE E. FARMER
Wallace P. Lamb
ATTORNEY

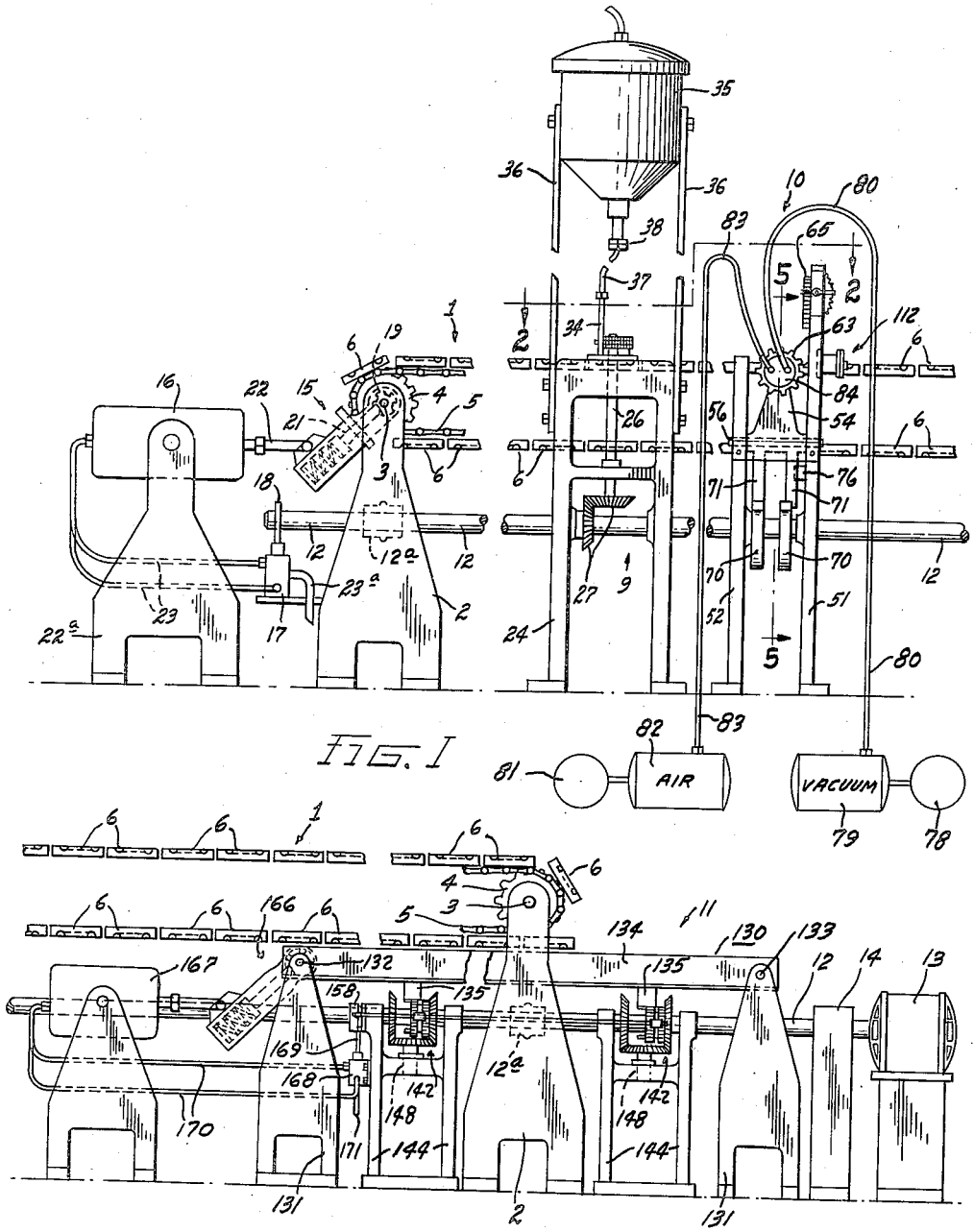

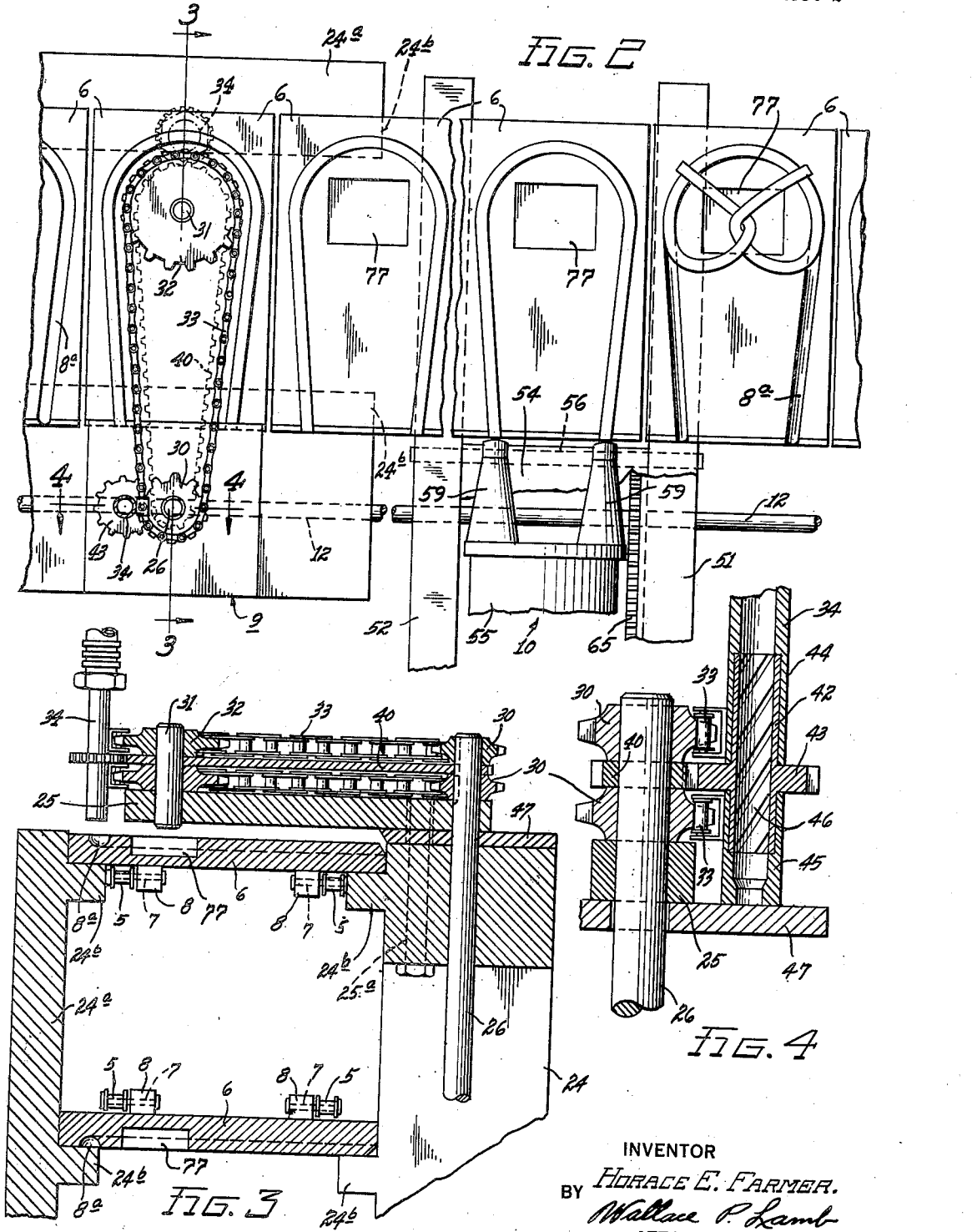

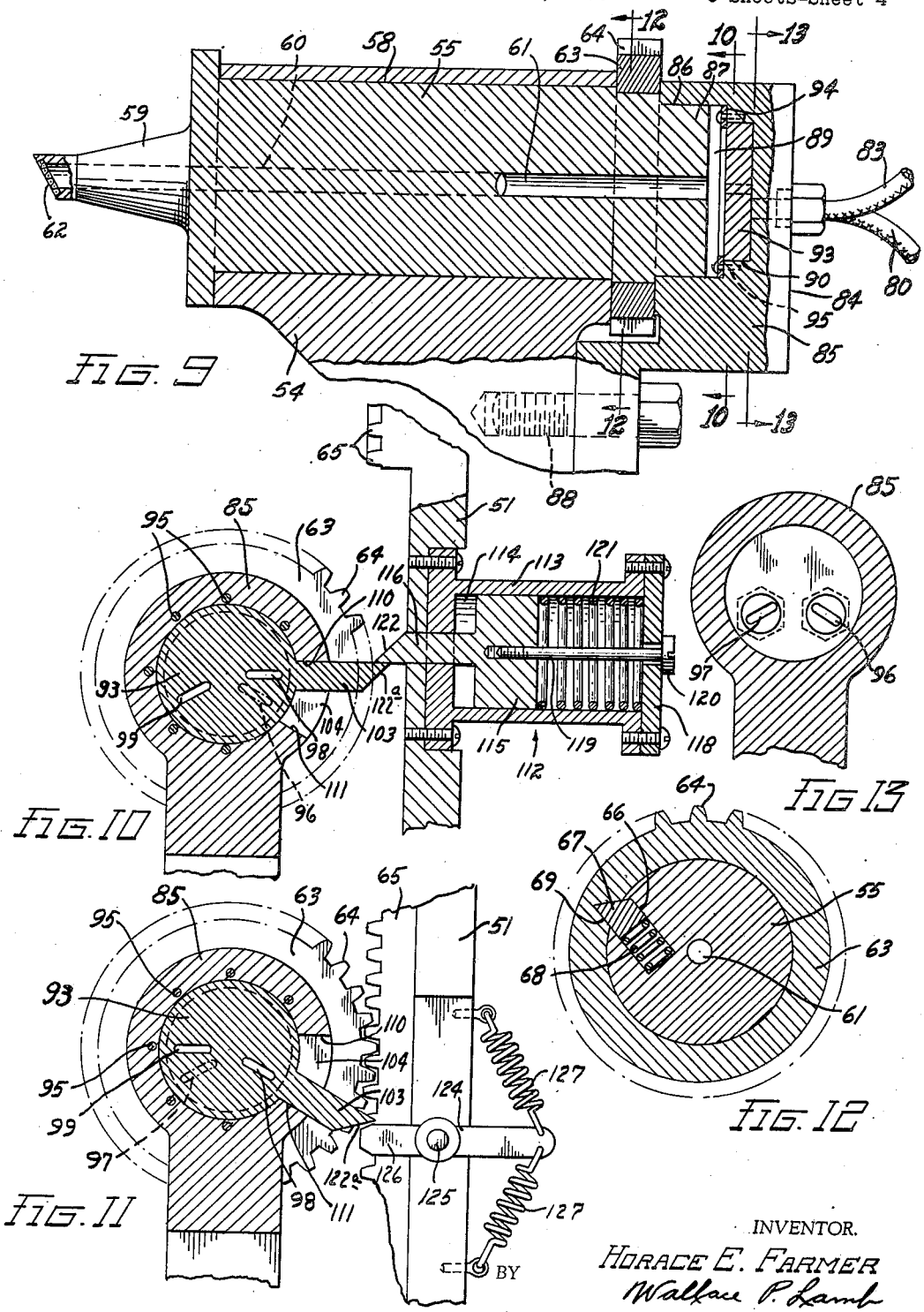

Aug. 6, 1940.   H. E. FARMER   2,210,864
PRETZEL MAKING APPARATUS
Filed Jan. 13, 1938   6 Sheets-Sheet 5

INVENTOR.
HORACE E. FARMER.
BY  Wallace P. Lamb
ATTORNEY.

Aug. 6, 1940.   H. E. FARMER   2,210,864
PRETZEL MAKING APPARATUS
Filed Jan. 13, 1938   6 Sheets-Sheet 6

INVENTOR.
HORACE E. FARMER.
BY Wallace P. Lamb
ATTORNEY.

Patented Aug. 6, 1940

2,210,864

UNITED STATES PATENT OFFICE 2,210,864

PRETZEL MAKING APPARATUS

Horace E. Farmer, Grosse Pointe Farms, Mich.

Application January 13, 1938, Serial No. 184,909

30 Claims. (Cl. 107—8)

My invention relates generally to bakery apparatus and more particularly to pretzel making apparatus.

One of the objects of my invention to provide a new and improved pretzel making apparatus by means of which twisted pretzel forms may be successfully produced on a commercial basis.

Another object of my invention is to provide a new and improved pretzel making apparatus by means of which the cost of producing twisted pretzels is reduced.

Another object of my invention is to provide a new and improved pretzel making apparatus of the above mentioned character by means of which pretzels can be produced without need of handling by human hands.

Another object of my invention is to provide a new and improved pretzel making apparatus which will efficiently produce twisted pretzel forms without need of changing the established, desired consistency of pretzel dough.

Another object of my invention is to provide a novel device for putting the conventional twist in a pretzel.

Another object of my invention is to provide an apparatus for putting a twist in a dough strip and one in which positive disengagement of the dough from the apparatus after the twist has been made is assured.

Another object of my invention is to provide a pretzel twisting apparatus in which sticking of the dough thereto after the twisting operation is prevented without greasing or otherwise treating the dough.

These objects and the several novel features of the invention are hereinafter more fully described and the preferred form of construction by which these objects are attained is shown in the accompanying drawings in which—

Figure 1 is a broken view shown in side elevation of a pretzel making apparatus embodying features of my invention.

Figure 1a is a view shown in side elevation showing a continuation of the apparatus of Figure 1.

Figure 2 is an enlarged fragmentary view of my apparatus taken in the direction of the arrows 2—2 of Figure 1.

Figure 3 is a view showing a novel dough strip feed device in cross section taken along the line 3—3 of Figure 2.

Figure 4 is an enlarged detail view shown in cross section taken along the line 4—4 of Figure 2.

Figure 5 is an enlarged view showing my novel pretzel twisting device in cross section, taken along the line and in the direction of the arrows 5—5 of Figure 1.

Figures 6, 7 and 8 are views similar to Figure 5 illustrating the operation of my pretzel twisting device.

Figure 9 is an enlarged detail view shown in cross section of a vacuum head and valve therefor of my pretzel twisting device.

Figure 10 is a view in cross section of the valve taken along the line and in the direction of the arrows 10—10 of Figure 9.

Figure 11 is a view similar to Figure 10 showing the valve in another position.

Figure 12 is a detail view shown in cross section, taken along the line and in the direction of the arrows 12—12 of Figure 9.

Figure 13 is a detail view shown in cross section, taken along the line and in the direction of the arrows 13—13 of Figure 9.

Figure 14 is a top plan view of the apparatus shown in Figure 1a.

Figure 14:
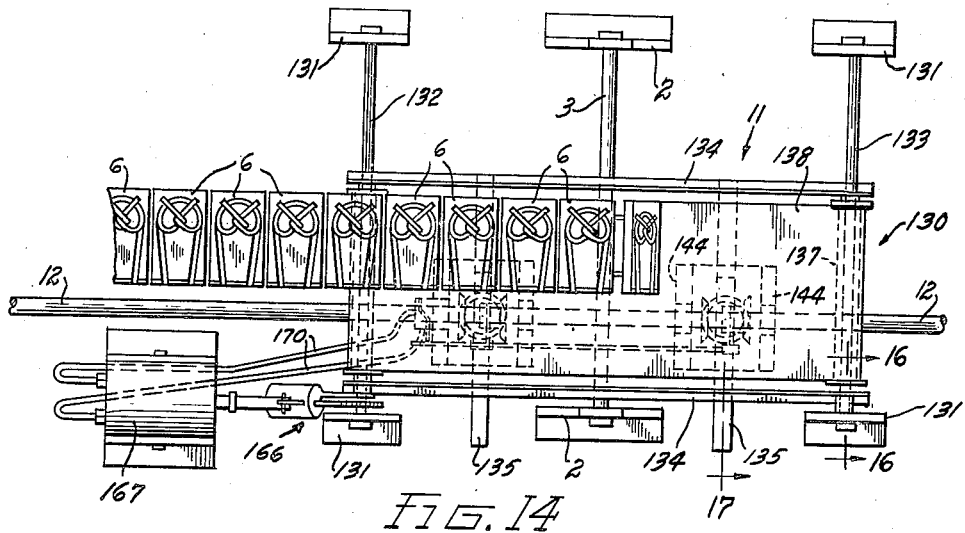
Figure 15:
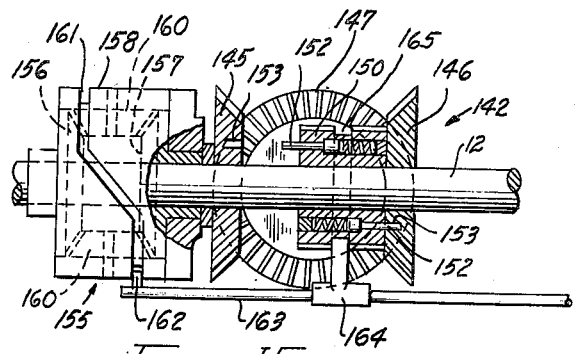
Figure 15 is a detail view shown partly in cross section and partly in elevation of indexing mechanism employed with my apparatus.

Referring to the drawings by characters of reference and first to Fig. 1, the numeral 1 designates in general a supporting member, in the form of a conveyor, having at each end thereof a pair of spaced uprights or standards 2. Each pair of the uprights 2 supports a shaft 3 and on each shaft there is a pair of spaced sprockets 4 around which travel two spaced continuous chains 5. Carried by the chains 5 there is a plurality of spaced supporting members or plates 6 for supporting dough strips, and these plates 6 are preferably hinged or pivoted adjacent their forward edges to the chains 5. Each of the plates 6 may be pivotally connected to the spaced chains 5 by a pair of spaced aligned pins 7, see Fig. 3. The pins 7 connect certain of the chain links, at spaced intervals therealong and each of the plates preferably has a pair of laterally spaced lugs 8 which position between the chains and have aligning apertures to receive the pins 7. Preferably each of the plates 6 has a substantially U-shaped groove or indentation 8a in its upper surface to receive a strip of dough, and preferably the end portions of the U-shaped indentation 8a converge toward each other and run out at a side edge of the plate having their terminal ends in spaced relation to each other. As will hereinafter be seen, the U-shaped indentations 8a serve to retain dough strips in a desired shape or form, to aid in the formation of the strips into twisted pretzel shapes.

Associated with the conveyor 1 there is a dough strip feed device 9, a pretzel twisting and forming device 10, and a pretzel form unloading device 11. The dough strip feed device 9 is preferably located adjacent one or the front end of the conveyor 1, the unloading device 11 at the other or discharge end of the conveyor, and the pretzel twisting and forming device 10 intermediate the feed and unloading devices. The feed device 9, twisting and forming device 10 and unloading device 11 are all preferably operated from a main drive shaft 12 which preferably extends below and longitudinally of the conveyor 1, and the operation of these devices and the conveyor are synchronized, as will later be seen. The main shaft 12 may be journaled in bearings in cross members 12a of the conveyor uprights 2 and may be driven or rotated by an electric motor 13 through suitable speed reducing mechanism, designated in general by the numeral 14.

The conveyor 1 is preferably intermittently opeated by stations at regular time intervals and to this end a pawl and ratchet mechanism 15 may be provided, operated by an air operated piston (not shown) in a cylinder 16 which may be controlled by a valve 17 operated by a cam 18 on the main drive shaft 12. Pawl and ratchet mechanisms driven by air cylinders are well known and therefore a detailed description of such a mechanism is deemed unnecessary. At one end of the conveyor 1, the ratchet, as at 19, may be keyed or otherwise secured to the sprocket shaft 3, and the pawl, as at 21, may be connected to the air cylinder piston by a reciprocal connecting or push rod 22. The air cylinder 16 is supported for pivotal movement on a standard 22a and may be of the type in which air under pressure, controlled by the valve 17, is first delivered to one side of the piston to move the conveyor ahead a predetermined distance, and then is delivered to the other side of the piston to retract the pawl 21. The air cylinder 16 may be connected to the valve 17 by flexible conduits 23 and the valve may be connected to a source of supply of air under pressure by means of a conduit 23a.

Referring now in detail to my dough strip feed device 9, this device operates to put a strip of dough of predetermined length into the U-shaped indentation 8a of each of the plates 6 as they are presented thereto. The dough strip feed device preferably includes a pair of uprights or standards 24 and 24a that are spaced apart on opposite sides of the conveyor and these standards preferably have horizontal slideways 24b on which the conveyer plates 6 are slidably supported and guided, see Fig. 3. The standard 24 preferably has a horizontal supporting member or bed plate 25 which overlies or extends across the conveyor 1. The plate 25 may be secured to the standard 24 by screws 25a or by other suitable means. Journaled in an aperture or bearing in the standard 24 there is a shaft 26 whose axis of rotation preferably extends vertically, and the shaft 26 is driven or rotated by rotation of the main shaft 12 through bevel gears 27, Fig. 1. The shaft 26 projects slightly above the upper surface of the bed plate 25, and keyed or otherwise secured thereto above the bed plate there is a pair of drive sprockets 30. Secured in and to the bed plate 25, overlying the conveyor 1, there is a vertically extending stub shaft 31 on which a second pair of sprockets 32 are journaled for rotation, these sprockets being horizontally spaced from the sprockets 30. Continuous chains 33 travel around the sprockets 30, 32 and secured to the chains for travel therewith there is a dough discharge or extruding nozzle 34.

Preferably a container or hopper 35 is provided for containing a supply of dough for delivery to the nozzle 34, and the container 35 may be mounted above the standard 24 on spaced uprights 36. The container 35 may be connected to the nozzle 34 by a flexible conduit or hose 37. Preferably the conduit 37 is connected to the container 35 by a rotatable coupling 38 so that the nozzle can rotate relative to the conduit as the nozzle moves through its path of travel. Dough may be supplied from the container 35 to and be discharged from the nozzle 34 at a constant rate of discharge by a piston (not shown) in the container 35, which piston may be urged downward by air pressure. If desired the dough may be supplied from the container 35 to and be discharged from the nozzle 34 by a screw feed device, or by any other suitable means which will discharge dough from the nozzle at a constant rate of discharge. The drive sprockets 30 are of smaller diameter than the driven sprockets 32 and the diameters of the sprockets are made such that the nozzle 34 will travel over and follow around the U-shaped indentations 8a in the plates 6 to deposit therein a strip of dough of general U-shape having converging end portions.

A horizontally disposed, stationary gear 40 of plate-like form may be interposed between the upper and lower sprockets 30 and 32 and may have external gear teeth, as at 41. The general contour of the outer periphery of the stationary gear 40 is the same as the path followed by the nozzle 34. Positioned in the discharge nozzle 34 there is a rotor 42 for kneading the dough, and the rotor 42 has an external gear 43 adapted to mesh with the stationary gear 40 whereby the rotor is rotated relative to and on travel of the nozzle 34. The rotor 42 may be an open ended tubular member and its gear 43 may be formed integral therewith and be located intermediate the ends of the tubular rotor, or the gear 43 may be keyed or otherwise secured to the tubular rotor for rotation therewith. Preferably the nozzle 34 is formed in two tubular sections comprising an upper section 44 and a lower section 45, and opposite end portions of the tubular rotor 42 fit into the nozzle sections 44 and 45 to connect and hold the nozzle sections in vertcial alignment with each other. The upper nozzle section 44 may be secured to the upper chain 33 and the lower nozzle section 45 may be secured to the lower chain 33. The upper and lower chains 33 hold the nozzle sections 44 and 45 together and also serve to limit canting of the nozzle to steady it as it is moved through its path of travel. A lower end portion of the upper nozzle section 44 and an upper end portion of the lower nozzle section 45 are preferably of enlarged internal diameter to receive the tubular rotor 42, the inner wall surface of which is preferably flush with the inner wall surfaces of the nozzle sections 44 and 45. The inner wall surface of the rotor 42 is preferably irregular in form and may have serrations 46, or other extended portions, for engaging and twisting the dough as it passes down through the rotor. Mounted on the upper end of the standard 24 there is a plate 47, and the lower or discharge end of the nozzle 34 engages and rides on the upper surface of the plate 47 to stop flow of dough from the nozzle after it has deposited a strip of dough on the conveyor, or during the time interval that the nozzle travels around the smaller sprockets 30. The plate 47 may also be provided with a knife edge 48 adjacent the conveyor 1 to cut off the dough strips as the nozzle crosses the cutting edge. As shown in Fig. 2, the nozzle 34 has completed its travel over one of the conveyor plates 6 and during its travel from the position shown around the smaller sprockets 30, the conveyor 1 will be moved ahead one step to position the next of the plates 6 in position to receive a strip of dough from the nozzle 34.

Referring now to my pretzel twisting and forming device 10, this device preferably includes a pair of standards or uprights 51 and 52 spaced from each other longitudinally of the conveyor 1 and these uprights preferably have upwardly facing slideways 53 to support and guide the conveyor plates 6. Supported by and disposed between the uprights 51 and 52, there is a reciprocal carrier or cradle 54 that carries a pretzel twisting element 55 in the form of a vacuum head member. The cradle 54 is supported on a shaft 56 that is positioned to travel in guideways 57 which may be aligned elongated slots provided in the uprights 51 and 52. The slots 57 extend at an angle upwardly and toward the upper conveyor plates 6 and the opposite ends of the slots are preferably rounded, as shown, to conform to the shaft 56. The vacuum head 55 is preferably cylindrical in shape and is preferably journaled for rotation in a bore or bearing 58 provided in the cradle 54. The vacuum head 55 is positioned above the shaft 56 with one end disposed toward the conveyor, and the axis of rotation of the head 55 is preferably substantially transverse to the longitudinal axis of the shaft 56.

Extending from its front end, the vacuum head 55 preferably has a pair of diametrically spaced, open-ended hollow arms or tubes 59 that are integral with the head and have their outer ends disposed toward the upper conveyor plates 6. The tubes 59 communicate with passages or bores 60 in the head 55 and the bores 60 lead into a passage or bore 61 that preferably opens through the rear end of the head 55. The outer open ends of the tubes 59 are spaced apart a distance substantially equal to the spacing of the terminal ends of the U-shaped indentations 8a in the conveyor plates 6. Dough strips are successively presented to the vacuum head 55 with the terminal ends of the dough strips in close proximity to the outer open ends of the vacuum head tubes 59. When a vacuum is created in the vacuum head 55 the ends of a dough strip are drawn thereto and close and seal the tubes from outside atmosphere. In order to prevent drawing of dough into the tubes 59 or head 55, the outer ends of the tubes may be perforated or may be provided with screens, as at 62, Fig. 9.

The head 55 projects externally of the cradle 54 at the rear end thereof and is surrounded by a gear 63 having external gear teeth 64 adapted to mesh with a stationary gear rack 65 provided on the upright 51. Preferably, the head 55 and the gear 63 are coupled to rotate together in one direction by lost motion connecting means or by a so called overrunning clutch so that the head 55 will not be rotated on rotation of the gear 63 in the opposite direction. To this end, the head 55, Fig. 12, may be provided with a recess or bore 66 opening through its side wall to receive a detent 67 which may be urged outwardly by a spring 68 and may have a tapered end to seat in a recess or socket 69 provided in the inner wall of the gear 63. It will be seen that the gear 63 and the head 55 will be locked together on rotation of the gear in a clockwise direction, as seen in Fig. 12, and that on counterclockwise rotation of the gear, the detent 67 will be forced or pressed inwardly thereby permitting lost motion between the gear and the head 55.

The vacuum head 55 is preferably moved or actuated from the main drive shaft 12 on which there may be secured a pair of spaced cams 70, Fig. 1, adapted to engage with spaced cam engaging members or followers 71 integral with and depending from the cradle 54. Preferably two spaced cams are employed so as to prevent or limit movement of the cradle 54 in planes parallel to the axis of its shaft 56. The cams 70, Fig. 5, are alike and each has a riser cam surface portion 71a leading to a step 72 from which there is a declining surface portion 73. It will be seen that as the cams 70 rotate, the cradle 54 will be moved upward and forward toward the conveyor 1 guided by the shaft 56 in the elongated slotted guideways 57. The cradle 54 will move upward until the shaft 56 abuts the upper ends of the guide slots 57 and in order to prevent the cradle from tipping forward toward the conveyor during this movement, a releasable or yieldable means such as a helical coil spring 74 may be provided. One end of the spring 74 may be secured to the cradle 54 and the other end of the spring may be secured to a cross member 75 secured to the uprights 51 and 52. A stop member 76 is preferably provided for engagement by one of the cam followers 71 to limit downward movement of the cradle and to also aid in guiding the cradle, in its reciprocal movement. In the present instance, each of the conveyor plates 6 is provided in its upper surface with a clearance cutout 77 for the vacuum head tubes 59.

A vacuum may be produced in the vacuum head 55 by a pump 78, Fig. 1, connected to a vacuum tank 79 which in turn may be connected to the vacuum head 55 by a flexible conduit or hose 80. In order to insure disengagement of the ends of the dough strip from the vacuum head 55 after the strip has been twisted and formed into a pretzel shape, I prefer to send a blast of air through the passages of the vacuum head and to this end a pump or compressor 81 may be provided and may be connected to a compressed air tank 82 which in turn may be connected to the vacuum head 55 by a flexible conduit or hose 83. A vacuum is produced in the head 55 to hold the end portions of a dough strip thereto while being formed into a pretzel shape by movement of the head, and then a blast of air is sent through the vacuum head to positively disengage the dough from the vacuum head. The use of a blast of air through the vacuum head 55 not only provides a positive means to disengage the ends of the dough strip from the vacuum head, but also serves to keep the interior of the vacuum head, its arms or tubes 59 and screens 62 clean and free of dough and other particles. The alternate production of a vacuum and a blast in the vacuum head 55 is controlled by a valve 84 which is preferably carried by and operated on movement of the vacuum head and cradle 54.

The valve 84, Fig. 9, includes a body or casing 85 which may be of general cylindrical form and may have a bored recess 86 in one end thereof in which a reduced rear end portion 87 of the vacuum head 55 may be rotatably received. The valve casing 85 may be rigidly secured to the cradle 54 by screws 88, or by other suitable means. Preferably the outer rear end wall of the vacuum head 55 is spaced from the recessed end wall of the valve casing 85 to provide a chamber 89 in communication with the passage or bore 61 in the head 55. The inner end wall of the valve casing 85 is preferably provided with a cylindrical recess 90 in which is positioned a plate-like rotatable valve member 93. The valve member 93 may be retained in the recess 90 by a retaining ring 94 that may be held in place by screws 95, or by other suitable means. Extending through its outer end wall the valve casing 85 has two passages 96 and 97, Fig. 13, which are adapted to register with similar passages 98 and 99 respectively through the valve member 93. When the valve passage 98 is in registry with the valve casing passage 96 the interior of the vacuum head 55 is communicatively connected to the suction or vacuum producing means, and when passages 97 and 99 are in registry or communication, the vacuum head 55 is communicatively connected to the compressed air tank 81.

The valve member 93 has an operating arm 103, Figs. 10 and 11, that projects externally of the valve casing 85 through an elongated aperture 104 in the side wall thereof, and the operating arm 103 may extend toward the standard upright 51. The opposite end walls, as at 110 and 111, of the aperture 104 may serve as abutments for engagement by the arm 103 to limit rotation of the valve 93 in opposite directions. As shown in Fig. 10, when the valve operating arm 103 is in abutment with the upper end wall 110 of the aperture 104, the valve member aperture 99 is in registry with the air blast passage 97. When the valve 93 is moved to the position shown in Fig. 11 with the valve operating arm abutting the lower stop 111, communication with the air blast will be discontinued and the valve aperture 98 will be in registry with aperture 96 establishing communication between the vacuum head 55 and the vacuum tank 79.

A trip or abutment member, designated in general by the numeral 112, is provided for engagement by the valve operating arm 103 to cause the valve member 93 to be actuated on movement of the cradle 54 and vacuum head 55. The trip member 112, Fig. 10, preferably has a supporting member or casing 113 that may be rigidly secured to the standard upright 51 and the casing 113 may have a cylindrical chamber 114, the longitudinal axis of which preferably extends substantially transverse to the axis of rotation of the valve member 93. In the present instance, the trip member 112 includes a piston-like portion 115 that is longitudinally and slidably movable in the cylindrical chamber 114, and the trip member 112 may have a reduced portion 116 projecting externally of the casing 113 for engagement with the valve operating arm 103. The outer end of the casing 113 is preferably closed by a closure plate or cover 118 which may be secured to the casing by screws, or by other suitable means. Through the cover 118, centrally thereof, there is preferably an aperture for slidably receiving a screw 119, one end of which is screw threaded into the piston portion 115 and the other end of which has a head 120 for abutment with the outer wall surface of the cover 118. Surrounding the screw 119 within the chamber 114 there is a helical coil spring 121 under compression urging the trip or abutment member 112 outwardly, outward movement of the trip member being limited by engagement of the screw head 120 with the cover or casing outer end wall 118. It will be seen that the outer position in which the trip member 112 may be held by the spring 121 may be regulated or adjusted by means of the screw 119. Preferably the reduced portion 116 has an upwardly facing, angularly disposed or beveled surface portion 122 at its outer end and preferably the valve operating arm 103 has a similar but downwardly beveled end portion 122a. These beveled surfaces 122 and 122a are adapted to engage on downward movement of the cradle 54, and the trip member 112 is moved inward against the action of spring 121, to permit the valve operating arm 103 to pass thereby to the position shown in Fig. 10.

When the cradle 54 is in its down position, as shown in Fig. 10, an end portion of the abutment arm 116 is immediately above and slightly overlaps an end portion of the valve operating arm portion 103 so that on initial upward movement of cradle 54 the valve operating arm 103 will be rotated in a clockwise direction, toward the position shown in Fig. 11, in which position the passage 98 of the valve 93 aligns with the passage 96 in the valve casing 85 which connects the vacuum head 55 to the vacuum tank 79. When the valve member 93 is moved to this position its operating arm 103, because of its arcuate movement, disengages from the trip member 112. Also when the cradle 54 is in its down or starting position, the outer ends of the tubes 59 are slightly below the terminal ends of the dough strip in the plate 6 that is then in position before the device 10.

Spaced from the trip member 112 there is a second trip or abutment member 124, Fig. 11, for the valve member 93, and the trip member 124 may be mounted on the standard upright 51 adjacent the upper end thereof. The trip member 124 may be in the form of a lever and may be pivotally supported on a pin or shaft 125 secured in and to the upright 51. The lever 124 has an arm 126 for engagement by the valve operating arm 103, and a pair of opposing, helical coil springs 127 may be provided to yieldably oppose pivotal movement of the lever 124 in opposite directions.

My twisting and forming device 10 operates as follows: The conveyor 1 periodically presents a dough strip to the forming device 10 and the cradle 54 and head 55 carried thereby are then moved upward by the cams 70 rotated by the main drive shaft 12. On initial upward movement of the cradle 54 the valve 93 by reason of the engagement of its operating arm 103, with the trip arm 116, is rotated until the operating arm 103 reaches the position shown in Fig. 11. In this position, the valve passage 98 registers with the passage 96 in the valve casing 85 discontinuing the air blast and establishing communication between the head 55 and the vacuum tank 79. This movement of the cradle 54 aligns the ends of the vacuum head tubes 59 with the ends of a dough strip and the ends of the dough strip are drawn and held to the ends of the tubes over the openings or outlets in the screen members 62. The cradle 54 continues upward lifting end portions of the dough strip from its supporting plate 6 until the cradle shaft 56 engages the upper ends of its guideways 57, as shown in Fig. 6. During this upward movement of the cradle 54, the cradle is prevented from tipping forward toward the conveyor 1 by the spring 4 and the cradle is prevented from tipping in the opposite direction by reason of the stop member 76 with which one of the cam abutment members is held in sliding contact by the spring 74. The gear 63 carried by the vacuum head 55 now meshes with its stationary gear rack 65 which causes the head 55 to be rotated through 360°, twisting end portions of the dough strip one about the other. In Fig. 7, the head 55 is shown after it has been rotated through 270°. During rotation of the head 55, the cradle 54 is being tilted forward and downward toward the conveyor 1 by the cams 70 and after the head has rotated 360° to the position shown in Fig. 8, the ends of the dough strip are placed in spaced relation to each other on the loop of the dough strip. During the pivotal movement of the cradle 54 about the axis of its shaft 56, the valve operating arm 103 comes in contact with the trip lever 124 which is thereafter pivoted out of the way so that the arm 103 can pass thereby. When the cams 70 have rotated such that the cradle cam engaging members 71 ride down the cam surface portions 73 the cradle 54 is tilted back and is pivoted away from the conveyor 1 by the spring 74 and the cradle then returns to its starting or down position against the stop 76. Upon pivotal movement of the cradle 54 on its return to the starting position, the indent 67 is forced inward preventing rotation of the head 55. Also on return movement of the cradle 54, end portions of the dough strip and a portion of the loop against which they have been pressed are slightly raised from the conveyor but upon this slight movement the valve operating arm 103 is actuated by the upper trip lever 124 to discontinue the subatmospheric pressure in the head 54 and at the same time establish communication between the head and the compressed air tank 82. A blast of air is then sent through the head 55 and positively disengages the ends of the dough strip from the ends of the tubes 59. As the cradle 54 approaches its down position, the valve operating arm 103 engages and moves the trip member plunger 115 inwardly against the action of the spring 121 until the arm 103 is past the engaging members after which the parts assume the positions shown in Fig. 10. The ends of the dough strip are preferably pressed by the head 55 onto the loop portion of the strip so that they will adhere thereto, but if desired they may be dropped onto the loop portion of the strip. The vacuum head 55 is efficient in operation to form large quantities of pretzels per unit of time. It will be appreciated that after the twisting operation, the dough strip ends will be released without sticking, and heretofore this has been one of the major problems in pretzel forming apparatuses, particularly those having mechanical grasping hands or fingers. If desired, the vacuum head 55 may be used solely as a holding means while, for example, a dough strip support is moved to twist the dough strip, or both the head and the support could move in cooperation in the forming operation. It will further be seen that it is not essential that the vacuum head openings align with the terminal ends of the dough strip for the head could be mounted vertically, or substantially so, and engage the end portions of a dough strip. My invention also contemplates the use of one or more vacuum heads in the twisting of two or more dough strips one about the other, which is practiced by hand in the making of certain kinds of bread.

Figure 16:
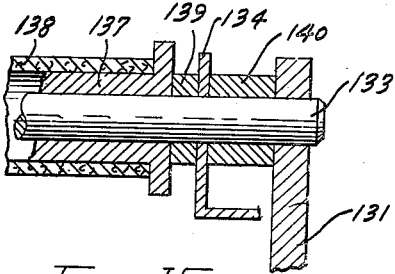
Figure 16 is an enlarged view shown in cross section, taken along the line 16—16 of Figure 14 showing section details of construction.
Figure 17:
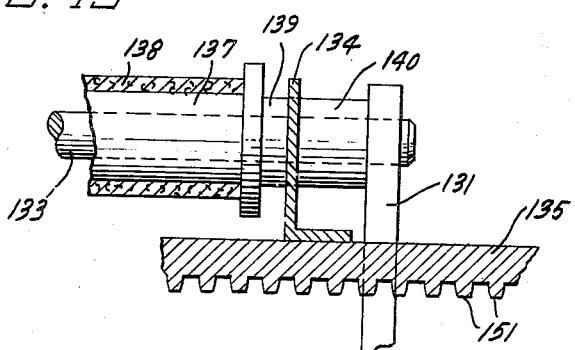
Figure 17 is an enlarged view in cross section, taken along the line 17—17 of Fig. 14 showing certain other details of construction.

The purpose of laying the dough strips on the conveyor with their end portions converging will now be apparent. It will be seen that the arms 59, while rotating, describe a helix on a curve and deposit the ends of a dough strip on the loop thereof at points straight across the conveyor from the terminal ends of the U-shaped indentations 8a. Thus, it will be seen that if the dough strips are not placed on the conveyor with their end portions converging, the ends when bent back by the vacuum head 55 would not fall on the loop of the strips. The above is true providing, of course, that the arms 59 are in fixed, spaced relation to each other. While I prefer, for simplicity of construction, to deposit the dough strips onto the conveyor as shown and described, it will be apparent that the arms 59 could be made movable toward and away from each other so that a dough strip deposited in any form or shape could be picked up, twisted and the ends moved toward each other prior to their placement on the loop of the strip. The unloading mechanism 11 includes a conveyor 130, Fig. 14, that is disposed beneath the discharge end of the main conveyor 1, and the conveyor 130 may have at each end thereof a pair of spaced standards or uprights 131. One pair of the uprights 131 supports a drive shaft 132 and the other pair of uprights 131 supports a shaft 133, these shafts being substantially parallel with their axes substantially transverse to the main drive shaft 12. The conveyor 130 has a carriage that is slidably movable on the shafts 132, 133 transverse to the direction of movement of the main conveyor 1 and this carriage may include two spaced substantially parallel angle members 134 having apertures or bearings to receive the shafts 132 and 133. The angle members 134 are spaced apart and are preferably rigidly secured together by a pair of spaced cross members 135 providing a rigid conveyor carriage. Mounted on each of the shafts 132 and 133 between the angle members 134, there is a pulley or drum 137 and around these drums travels a continuous belt 138. The ends of the drums 137 may be spaced from the angle members 134 by tubular spacer members 139 and the angle members 134 may be spaced from the uprights 131 by tubular spacer members 140, Figs. 16 and 17. The drums 137 are supported for sliding reciprocating movement on and longitudinally of the shafts 132 and 133, the drive drum also being keyed to rotate with the drive shaft 132.

Beneath the unloading conveyor 130 and driven from the main shaft 12, there are two spaced gear mechanisms 142 for reciprocating the conveyor carriage and these gear mechanisms may be supported by standards 144 that may have bearings to receive the main drive shaft 12. The mechanisms 142 are alike and each may include three bevel gears comprising a drive gear 145, a driven gear 146 and an intermediate gear 147. The drive gear 145 and the driven gear 146 of each gear mechanism are spaced apart on the shaft 12 by the intermediate gear 147 which may be journaled on a vertical shaft 148 supported by the standards 144. The drive gears 145 may be keyed to the main drive shaft 12 and the driven gears 146 are free on the shaft 12 to rotate in the opposite direction to the direction of rotation of the drive gears 145. Each of the gear mechanisms 142 includes a sliding gear 150 and these gears 150 are in mesh with gear teeth 151 provided on the underside of the carriage cross members 135. The gears 150 are slidably mounted on the shaft 12, one between each pair of the gears 145 and 146. From its opposite ends, each of the gears 150 have spring pressed pins 152 adapted to engage in sockets or apertures 153 provided in each of the gears 145 and 146. The gears 150 are reciprocated between and are alternately coupled with their respective pairs of gears 145, 146. It will be seen that the direction of rotation of the gears 150 is reversed as they are alternately coupled with the gears 145, 146 with the result that the conveyor carriage is reciprocated on the shafts, 132, 133.

The gears 150 may be reciprocated on the shaft 12 by an indexing mechanism, designated in general by the numeral 155. The indexing mechanism 155 may include a pair of spaced beveled gears 156 and 157 on the main drive shaft 12. The gear 156 may be the drive gear and may be suitably secured to the shaft 12 and the gear 157 is a stationary gear which may be rigidly secured to one of the uprights 144. Inclosing the gears 156, 157 there is a rotatable drum 158 having internal pinion gears 160 that mesh with the gears 156, 157. In its outer periphery, the drum 158 has a cam slot 161 in which a cam follower member 162 is positioned. The cam follower 162 is rigidly secured to a reciprocal connecting rod 163 that may have spaced forks 164 adapted to engage in annular sockets or slots 165 provided in the shiftable gears 150.

The conveyer belt 138 may be periodically advanced by a pawl and ratchet mechanism 166 associated with the drive shaft 132 and driven by an air cylinder 167. This drive mechanism is the same as the drive mechanism of the main conveyor 1. The operation of the air cylinder 167 is controlled by a valve 168 actuated by an arm or projection 169 on the drum 158, see Fig. 1a. The valve 168 may be connected by flexible conduits 170 to opposite sides of the air cylinder piston (not shown) and by means of a conduit or hose 171 may be connected to a source of compressed air. Removable boards (not shown) may be placed on the conveyor belt 138 to receive the twisted pretzel forms which are arranged thereon in rows.

The operation of my pretzel making apparatus is as follows: The dough under pressure in the container 35 is urged by pressure through the flexible tube 37 to the nozzle 34. In the nozzle 34 and during the descent of the dough through the flexible tube 37 the dough is kneaded before being extruded from the nozzle by the action of the rotor 42 which operates on travel of the nozzle. The nozzle 34 is rotated with the chains 33 about the sprockets 30, 32 and deposits a strip of dough on one of the supporting plates 6, substantially in the form of a U with converging end portions, and the conveyor 1 is then moved ahead one station by the air driven pawl and ratchet mechanism and the nozzle moves over the next conveyor plate and deposits a strip of dough thereon. As each of the conveyor plates 6 is presented to the twisting and forming mechanism 10 a vacuum is produced in the head 55 to hold the ends of the dough strip thereto. The dough seals the ends of the tubes 59 and a sufficient vacuum or subatmospheric pressure is produced in the head 55 to pick up the dough strip end portions when the head is moved. The producing of a vacuum in the head 55 is controlled by the valve 84 which is carried by and actuated on movement of the head. The first operation of the twisting device is the picking up of the ends of the dough strip, during which operation the arms move toward and above the conveyor 1 to the position shown in Fig. 6. The cradle 54 and head 55 carried thereby are moved upward by the cams 70, rotated by the main shaft 12, and on such movement the valve 84 operates to connect the vacuum head 55 to the vacuum tank 79. As the gear 63 engages with the rack 65 the head is rotated and the ends of the dough strip are twisted one about the other, after which the ends of the dough strip are deposited on the loop of the strip. The valve 84 is then operated to release the vacuum and permit a blast of air to pass through the passages of the head 55 to disengage the ends of the dough strip therefrom. The cams 70, rotating in the direction of the arrow, permit the vacuum head 55 to return to its starting or down position, after which the conveyor 1 is moved ahead one station and the pretzel twisting and forming is then repeated on the next strip of dough. During the operation of the main conveyor 1 the plates 6 pivot or swing over and deposit the pretzel forms onto boards carried by the unloading conveyor 130. The unloading conveyor 130, as heretofore described, operates to arrange a number of the pretzel forms in rows on the boards which when full, may be removed to be salted and baked. It will be apparent that if desired the unloading mechanism could be omitted by arranging the main conveyor 1 to pass through an oven (not shown). The valves, cams and other controls of the apparatus are preferably timed so that simultaneously with the depositing of a strip of dough onto the main conveyor 1, by the feed device 9, the forming device 10 forms a dough strip into a pretzel shape after which the conveyor is advanced depositing a formed pretzel onto the unloading device 11. It will be seen that the ratio between gears 156, 157 and the pinion gears 160 determines the number of rows of pretzel forms that will be arranged on the removable supporting board.

Figure 18:
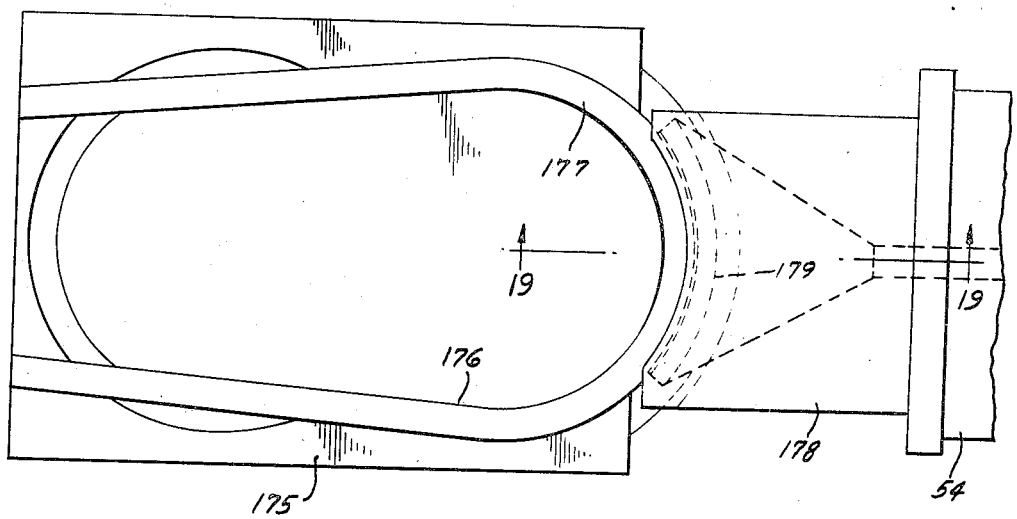
Figure 18 is a view of a modification of my pretzel twisting device.
Figure 19:
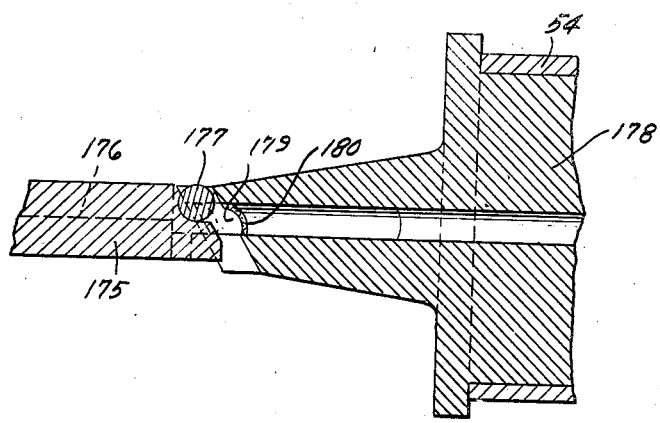
Figure 19 is a view shown in cross section and taken along the line 19—19 of Figure 18.

Referring now to my modified pretzel twisting device shown in Figs. 18 and 19, there is shown a supporting member or plate 175 for a dough strip, this plate being similar to the herein described conveyor plates 6. Like the plates 6, the plate 175 has a U-shaped groove 176 in which is deposited a strip of dough designated by the numeral 177. The groove 176 has end portions converging toward each other and running out of the plate 175 at what may be termed the rear edge of the plate. A vacuum head 178 is provided to twist the dough strip into a pretzel form and this head has a single opening 179 to which the loop of the strip is presented. The end of the head 178 having the opening 179 preferably conforms in shape to the loop portion of the dough strip and preferably a screen 180 is positioned over the opening 179 to prevent drawing of the dough into the head. In operation, the loop of the dough strip 177 is picked up by the vacuum head 178 which then rotates, putting a twist in the strip and then places the loop onto end portions of the strip. The mechanism for operating and controlling the vacuum head 178 may be the same as the mechanism previously described in connection with Fig. 1.

Having thus fully described my invention, its utility and mode of operation, what I claim and desire to secure by Letters Patent of the United States is:

1. In a pretzel making apparatus, a pair of hollow arms having spaced openings closable by a dough strip, and in which a vacuum is produced to hold the dough strip thereto, said arms being movable to put a twist in the dough strip, and means operable to move said arms.

2. In a pretzel making apparatus having a plurality of conveyor plates, each being provided with a substantially U-shaped indented portion and having a dough strip feed device for depositing a strip of dough into each of said indented portions, a forming device including a pair of hollow arms, having openings closable by a dough strip and in which a suction is produced to hold the ends of a dough strip thereto, means for rotating said arms substantially one revolution to twist the end portions of the dough strip one about the other, and means for moving said arms to place and press the end portions of the dough strip onto the loop thereof so that they will adhere thereto.

3. In a pretzel making apparatus having a dough supporting means and having means for depositing a strip of dough thereon in a substantially U-shape with converging end portions, a pretzel twisting device including a pair of hollow arms arranged for substantially registering with the ends of said dough strip, and in which suction is created to hold the ends of the dough strip thereto, means for rotating said arms together to twist the end portions of said dough strip one about the other, and means for moving said arms across said supporting means to bend the dough strip end portions back on the loop thereof.

4. In a pretzel making apparatus having a plurality of conveyor plates, each having a substantially U-shaped indentation and having a dough strip feed device operable to deposit a strip of dough into each of said indentations, a pretzel forming device including a rotatable vacuum head having a plurality of openings to atmosphere, the dough strips being intermittently and successively presented to the openings of said vacuum head to be held thereto by suction, means to rotate said head to put a twist in the dough strip, and means to move said head bodily to bend end portions of the dough strip back onto the strip portion therebetween.

5. A pretzel forming device comprising a supporting member for a dough strip, a vacuum head member having an opening closable by the dough strip, and to which the dough strip is held by suction, one of said members being movable to put a twist in the dough strip, and means to move said one member.

6. A pretzel forming device comprising a supporting member for a dough strip, a vacuum head member associated with said supporting member and having an opening closable by the dough strip, the dough strip being held to said head member by suction, one of said members being movable relative to the other of said members to put a twist in the dough strip, means to move said movable member, and a perforated member positioned over said opening to prevent drawing of the dough into said vacuum head member.

7. In a pretzel making apparatus having a dough supporting means and having a dough strip feed device for depositing strips of dough onto the supporting means, a vacuum head having a plurality of outlet ports to which the ends of a dough strip are presented and in which suction is created to hold the ends of the dough strip thereto, and means for rotating said head to twist the end portions of the dough strip one about the other and place the ends of the dough strip on the portion therebetween.

8. In a pretzel making apparatus having a dough supporting means and having means for feeding a strip of dough onto said supporting means in substantially a U-shape with the ends thereof converging, a forming device for forming the U-shaped strip into a pretzel shape including a movable vacuum head having a pair of openings to which the ends of the dough strip are presented and in which suction is created to hold the ends of the dough strip thereto, and means for moving said head to form the dough strip into a pretzel shape.

9. In a pretzel forming device, a rotatable vacuum head member having a pair of spaced openings to which the ends of a dough strip are presented, one end at each opening, and means for rotating said member to twist the end portions of the dough strip one about the other.

10. In a pretzel forming device, a vacuum head member having a pair of spaced openings to which the ends of a dough strip are presented and held to said member by suction, said member being movable to twist the ends of the dough strip one about the other and place the ends thereof on the portion of the strip therebetween, and means to move said member.

11. In a pretzel forming device, a pair of spaced hollow arms to the ends of which dough strips are presented and in which suction is created to hold the dough strip ends thereto, one end to each arm, and means for moving said arms to twist the ends of the dough strip one about the other and place the ends thereof on the portion of the strip therebetween.

12. In a pretzel forming device, a vacuum head member having a pair of openings to which the end portions of a dough strip are presented and held to said head by suction, means for moving said member to twist one end of the dough strip about the other, means for moving said member to bend the end portions back onto the loop of the strip, and means for controlling the production of the suction in said member.

13. In a pretzel forming device, a rotatable and bodily movable vacuum head member in which a vacuum and pressure are alternately produced and having a pair of outlets to which the end portions of a strip of dough are presented, the dough strip being held to the head by suction while being formed into a pretzel shape, means for rotating said member to twist end portions of the dough strips one about the other, means for moving said member to bend the end portions of the dough strip back onto the loop of the strip, and means for controlling the production of pressure in said member to disengage the dough strip therefrom.

14. In a pretzel forming device, a rotatable and movable vacuum head member having a pair of outlets to which the end portions of a strip of dough are presented and are held thereto while being formed, means for rotating said member to twist the end portions of the dough strip one about the other, means for moving said member to bend the end portions back onto the loop of the strip, and means for controlling the alternate production of a vacuum and a pressure in said member.

15. Pretzel forming apparatus comprising, a rotatable vacuum head member, a movable carrier for said member, said member being provided with openings leading therefrom to which the end portions of a dough strip to be formed are presented, and held thereto by suction, a gear carried by and for rotating said member, a gear rack arranged to drive said gear when said carrier is moved and the gear travels across the rack, means for moving said carrier and said member to twist the end portions of the dough strip one about the other while at the same time bending the ends back onto the loop of the strip, and means operable in accordance with movement of said head member for disengaging the ends of the dough strip from said head member after the strip is substantially twisted.

16. A pretzel forming device comprising a movable vacuum head member having a pair of openings to which end portions of a strip of dough are presented and held thereto by suction, the end portions of said dough strip substantially closing said openings, and means for moving said head member to twist said end portions of said dough strip one about the other and position said end portions for placement on the portion of the strip therebetween.

17. In a pretzel making device, a movable vacuum head member having a pair of outlets to which the ends of a dough strip are presented and held thereto by suction, one to each outlet, said dough strip ends closing and sealing said outlets from outside atmosphere, perforated screen means positioned over said outlets to prevent suction of dough into said head member, means for moving said head member to twist the ends of the dough strip one about the other, means for moving said head member to position the ends of said dough strip over the portion of the strip therebetween, the ends of the dough strip being positively disengaged from said member by provision of air pressure effected in said member, when the ends of the dough strip are in position over the portion therebetween, and means operable to control the producing of a vacuum and the producing of a pressure in said member.

18. In a pretzel twisting device, a vacuum head to hold a dough strip thereto and in which pressure is introduced for positively releasing the dough strip from the head, and valve means controlling the production of the vacuum and the pressure in said head.

19. In a pretzel forming device, a vacuum head to hold a dough strip thereto by suction and movable to put a twist in the strip, and means operable to move said head.

20. In a pretzel forming device, a vacuum head to hold a dough strip thereto by suction and movable to put a twist in the strip, means for moving said head, the suction being alternately started and stopped for respectively holding and releasing the dough strip, and means controlling the suction.

21. In a pretzel forming device, a vacuum head to hold a dough strip thereto by suction and movable to put a twist in the strip, means to move said head, and means controlling the vacuum in said head and actuated by and upon movement of said head.

22. In a pretzel forming device, a vacuum head to hold a dough strip thereto by suction and movable to put a twist in the strip, means to move said head, and means carried by said head and actuated by movement thereof to control the suction.

23. In a pretzel forming device, a vacuum head to hold a dough strip thereto by suction and movable to put a twist in the strip, means for moving said head, and valve means controlling the vacuum in said head in accordance with movement thereof.

24. In a dough handling device, a head in which suction and pressure are alternately produced respectively to hold dough to and release dough therefrom, and means operable for controlling the alternate production of a suction and of a pressure in said head.

25. In a pretzel forming device, a head in which a suction is produced to hold a dough strip thereto while being formed into a twisted pretzel and in which pressure is produced after twisting the pretzel to disengage positively the twisted pretzel from the head, and valve means controlling the production of a suction and of a pressure in said head.

26. In a pretzel forming device, a vacuum head to which a dough strip is held by suction, said head being movable to put a twist in the dough strip and to bend the strip to form a pretzel, and means operable to move said head.

27. In a pretzel forming device, a vacuum head to which a dough strip is held by suction, said head being rotatable to put a twist in the dough strip and being bodily movable to bend the strip into a pretzel shape, means to rotate said head, and means to move said head bodily.

28. In a pretzel making apparatus, a vacuum head in which suction is produced to hold a dough strip thereto, said head being rotatable to put a twist in the strip and also being bodily movable to bend the strip into a pretzel shape, means for bodily moving said head, and means for rotating said head including means carried thereby.

29. In a pretzel making apparatus, a vacuum head having an opening and in which suction is produced to hold a dough strip thereto over the opening, said head being rotatable to put a twist in the dough strip and being bodily movable to bend the strip so that end portions thereof will engage the loop of the strip, means for supporting said head, a gear rack, a gear carried by said head and cooperable with said rack to rotate said head upon movement bodily of said head, and means to bodily move said head.

30. In a pretzel making apparatus, a vacuum head member in which suction is produced to hold a dough strip thereto, said vacuum head member having an opening to atmosphere over which the strip is held to said head, a carrier member rotatable supporting said head member, said head member being rotatable to put a twist in the dough strip, said carrier member being movable from a starting position to a second position to bodily move said head to bend the strip so that end portions thereof will lie on the loop of the strip, guide means for said carrier member, a rack, a gear carried by said head and cooperable with said rack upon and by movement of said carrier member to rotate said head, a valve carried by said carrier member and controlling the suction in said head, means for moving said carrier member to said second position, and means operable to return said carrier means to said starting position.

HORACE E. FARMER.